United States Patent [19]

Lindstrom

[11] 4,033,551
[45] July 5, 1977

[54] TOOL FOR PULLING UNDERGROUND SERVICE WIRE UP A CONDUIT

[76] Inventor: Ralph E. Lindstrom, 1915 Sylvan Way, Bremerton, Wash. 98310

[22] Filed: July 6, 1976

[21] Appl. No.: 702,437

[52] U.S. Cl. .................................... 254/134.3 R
[51] Int. Cl.² .................................. E21C 29/16
[58] Field of Search ........... 254/134.3 FT, 134.3 R, 254/139.1, 139, 143; 214/1 H, 1 SW

[56] References Cited

UNITED STATES PATENTS

| | | | |
|---|---|---|---|
| 2,948,510 | 8/1960 | Kieser | 254/134.3 R |
| 3,072,382 | 1/1963 | Jones | 254/134.3 R |
| 3,072,383 | 1/1963 | Vanderhagen | 254/134.3 R |
| 3,968,952 | 7/1976 | Newell | 254/134.3 R |

*Primary Examiner*—Al Lawrence Smith
*Assistant Examiner*—Robert C. Watson

[57] ABSTRACT

This device consists primarily of telescoping tube members, which have, secured thereto, a pulley and a winch, which by line means thereon, will pull underground wire up the conduit of a meter base.

1 Claim, 2 Drawing Figures

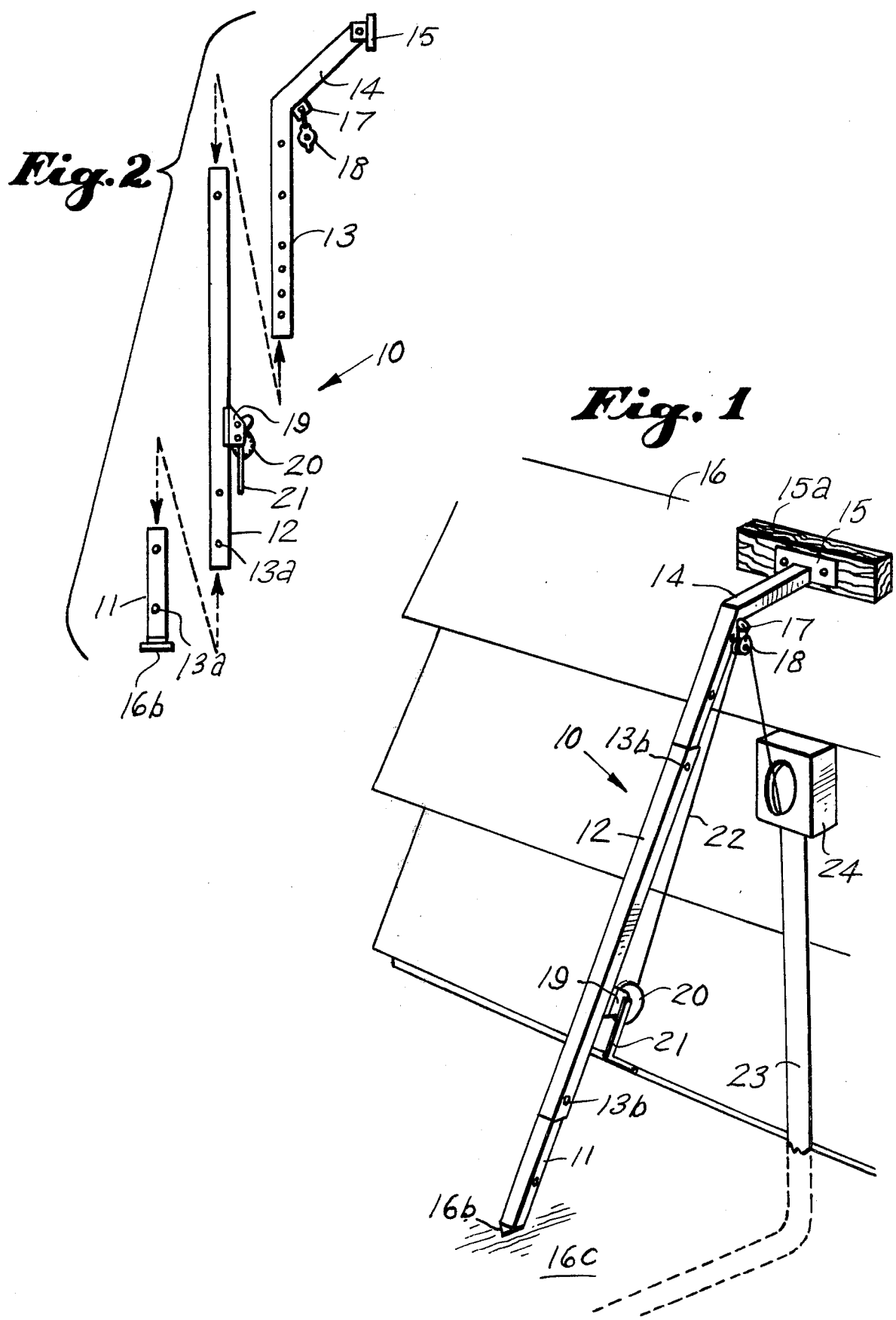

TOOL FOR PULLING UNDERGROUND SERVICE WIRE UP A CONDUIT

This invention relates to electrical tools, and more particularly to an underground service entrance wire puller.

It is, therefore, the principal object of this invention to provide a wire puller, which will be of such construction, so as to be adaptable for use by electric companies, so as to install underground service wire customers conduit and meter base.

Another object of this invention is to provide a wire puller, of the type described, which will employ winch and pulley means upon telescoping tubes, so as to pull stiff wires up a conduit. It is very difficult for a person to lie upon the ground and reach down into a trench, 24 to 30 inches deep, so as to push three large stiff wires up a conduit, and the present invention eliminates the former necessity of having to do so.

A further object of this invention is to provide a wire puller, of the type described, which will be of such construction, so as to employ the principal of leverage, against the building wall and the ground, so as to effectively, with winch means, pull stiff wires up a conduit.

Other objects of the invention are to provide an underground service entrance wire puller, which is simple in design, inexpensive to manufacture, rugged in construction, easy to use and efficient in operation.

These and other objects will be readily evident upon a study of the following specification and the accompanying drawing, wherein:

FIG. 1 is a perspective view of the present invention, as shown in operative use; and FIG. 2 is a side elevational view, showing the components disassembled.

According to this invention, a wire puller 10 is shown to include telescoping tubes 11, 12 and 13, which have openings 13a, for receiving suitable pins 13b, or other type fasteners, which will enable the puller to be adjustable in length.

Tubes 13 include an integral off-set portion 14, having a foot 15, which, with non-marring protection means 15a, will bear against the wall 16, when the base 16b, of tube 11, is in contact with ground 16c. A lug 17 is fixedly secured to off-set portion 14 in a suitable manner, and has, freely depending therefrom, a pulley 18. A bracket 19, of winch 20, is fixedly secured to tube 12, the winch 20 having handle grip 21 means for operating it. A line 22 is carried on the winch 20 and the pulley 18, the line being dropped down the conduit 23, after which it is attached to the stiff wire (now shown), to be pulled up the conduit, by means of winch 20. The stiff wire is pulled up into the meter base.

It shall be noted that wire puller 10 is adjustable to different lengths, so as to fit any meter base 24, on any building.

While various changes may be made in the detail construction, it is understood that such changes will be within the spirit and scope of the present invention, as is defined by the appended claims.

What I claim is:

1. An underground service entrance wire puller, comprising in combination, a tube assembly comprised of a plurality of inter-telescoping tubes each of which is of rectangular cross-sectional configuration and consisting of an intermediate tube which at a lower end thereof adjustably engages a ground-abutting tube and which at its other end engages a wall-abutting tube; each said tube having a plurality of spaced apart, transverse openings extending therethrough, said openings selectively receiving pin fasteners therethrough for securing said tubes together at any desired telescoping length; said intermediate tube having a winch secured to one side thereof by means of a bracket, said winch including a handle grip for operation of said winch, a line wound on said winch; said ground abutting tube having a base on its lower end for engaging a ground, said wall-abutting tube being of angular configuration by including an obtuse angle between straight opposite end portions thereof, one of said end portions for abutting a wall including a foot secured on its end and a nonmarring block affixed adjacent an end of said foot for engaging a surface of said wall, said block being substantially longer horizontally than said foot, and a lug affixed to said wall-abutting tube in a vicinity of said angle, said lug supporting a pulley, said pulley receiving a free end of said line therearound.

* * * * *